US012703937B2

(12) United States Patent
Seong et al.

(10) Patent No.: US 12,703,937 B2
(45) Date of Patent: Aug. 11, 2026

(54) CLOTHING MANAGEMENT APPARATUS AND CONTROL METHOD THEREOF

(71) Applicants: SAMSUNG ELECTRONICS CO., LTD., Suwon-si (KR); MEDIAEVER.CO., LTD., Suwon-si (KR)

(72) Inventors: Sujin Seong, Suwon-si (KR); Byung-In Ma, Suwon-si (KR); Kisup Lee, Suwon-si (KR); Yong Hoon Lee, Suwon-si (KR); Sukyoung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 104 days.

(21) Appl. No.: 18/754,985

(22) Filed: Jun. 26, 2024

(65) Prior Publication Data

US 2024/0344260 A1 Oct. 17, 2024

Related U.S. Application Data

(63) Continuation of application No. PCT/KR2023/001976, filed on Feb. 10, 2023.

(30) Foreign Application Priority Data

Feb. 16, 2022 (KR) ........................ 10-2022-0020177

(51) Int. Cl.
*D06F 34/18* (2020.01)
*D06F 34/28* (2020.01)
(Continued)

(52) U.S. Cl.
CPC .............. *D06F 34/18* (2020.02); *D06F 34/28* (2020.02); *D06F 58/10* (2013.01); *D06F 73/02* (2013.01);
(Continued)

(58) Field of Classification Search
CPC .......... D06F 34/18; D06F 58/10; D06F 34/28; D06F 2103/02; D06F 2105/38; D06F 73/02; G01N 21/33
See application file for complete search history.

(56) References Cited

U.S. PATENT DOCUMENTS 8,841,824 B2 9/2014 Ko et al.
10,060,063 B2 8/2018 Kim et al.
(Continued)

FOREIGN PATENT DOCUMENTS

JP 2017-67696 A 4/2017
JP 2020-203015 A 12/2020
(Continued)

OTHER PUBLICATIONS

International Search Report dated May 18, 2023 for corresponding application PCT/KR2023/001976.
(Continued)

*Primary Examiner* — Benjamin L Osterhout
(74) *Attorney, Agent, or Firm* — STAAS & HALSEY LLP

(57) ABSTRACT

A clothing management apparatus including: a body including a reception space to accommodate clothes to be managed; an optical sensor; a door; a display arrangeable at one side of the door; and a processor which controls the optical sensor to emit ultraviolet light, when reflected light of the emitted light is received through the optical sensor, identifies an allergen value of the clothes to be managed based on an intensity of the reflected light, identifies a degree of contamination of the clothes to be managed on the basis of the identified allergen value, and controls the display to display information on a recommended management course corresponding to the clothes to be managed on the basis of the identified degree of contamination.

19 Claims, 13 Drawing Sheets

(51) Int. Cl.

| | |
|---|---|
| ***D06F 103/02*** | (2020.01) |
| *D06F 58/10* | (2006.01) |
| *D06F 73/02* | (2006.01) |
| *D06F 105/38* | (2020.01) |
| *G01N 21/33* | (2006.01) |

(52) U.S. Cl.

CPC ...... *D06F 2103/02* (2020.02); *D06F 2105/38* (2020.02); *G01N 21/33* (2013.01)

(56) References Cited

U.S. PATENT DOCUMENTS

| | | | | |
|---|---|---|---|---|
| 10,563,338 | B2 | 2/2020 | Chen et al. | |
| 11,230,802 | B2 | 1/2022 | Hwang et al. | |
| 2017/0260681 | A1 | 9/2017 | Gao et al. | |
| 2020/0063323 | A1 | 2/2020 | Kessler et al. | |
| 2022/0042231 | A1* | 2/2022 | Jang | G06Q 30/0643 |
| 2022/0259794 | A1 | 8/2022 | Kim et al. | |
| 2022/0325460 | A1 | 10/2022 | Kim et al. | |

FOREIGN PATENT DOCUMENTS

| | | | |
|---|---|---|---|
| KR | 10-2013-0076982 | 7/2013 | |
| KR | 10-2019132 | 9/2019 | |
| KR | 10-2065424 | 1/2020 | |
| KR | 10-2021-0077501 | 6/2021 | |
| KR | 10-2021-0087728 | 7/2021 | |
| WO | WO-2009022831 A2 * | 2/2009 | D06F 29/00 |

OTHER PUBLICATIONS

Written Opinion dated May 18, 2023 for corresponding application PCT/KR2023/001976.

* cited by examiner

CLOTHING MANAGEMENT APPARATUS AND CONTROL METHOD THEREOF

CROSS-REFERENCE TO RELATED APPLICATION

This application is a continuation application, under 35 U.S.C. § 111 (a), of international application No. PCT/KR2023/001976, filed on Feb. 10, 2023, which claims priority under 35 U. S. C. § 119 to Korean Patent Application No. 10-2022-0020177, filed Feb. 16, 2022, the disclosures of which are incorporated herein by reference in their entireties.

BACKGROUND

Technical Field

The disclosure relates to a clothing management apparatus and a control method thereof, and more particularly, to a clothing management apparatus for allergy care, and a control method thereof.

Description of the Related Art

Clothing management apparatuses that process or renew clothes for removing wrinkles of clothes, or removing bad odor such as food smell permeated in clothes, etc. or dust are being widely used.

Meanwhile, in clothes, allergenic substances such as pollen, germs, mold, etc. may exist as well as dust, and separate care for allergenic substances in clothes is needed for satisfaction of customers.

SUMMARY

A clothing management apparatus according to an embodiment of the disclosure for achieving the aforementioned purpose may include a body including a reception space to a ccommodate clothes to be managed, an optical sensor, a door, a display arrangeable on one side of the door, and a processor configured to control the optical sensor to emit an ultraviolet light, based on an intensity of a reflected light received through the optical sensor due to the emitted light, identify an allergen value of the clothes to be managed, identify a degree of contamination of the clothes to be managed based on the identified allergen value, and control the display to display information on a recommended management course corresponding to the clothes to be managed based on the identified degree of contamination.

Here, the processor may identify a contamination level among a plurality of contamination levels based on the identified allergen value, based on the identified contamination level being smaller than a threshold level, recommend a first management course, and based on the identified contamination level being greater than or equal to the threshold level, recommend a second management course, wherein a sterilization treatment level of the second management course may be higher than a sterilization treatment level of the first management course.

Also, the clothing management apparatus may further include an air shower arrangeable on the inner side of the body, and the processor may control the air shower to emit air into the reception space, and after the clothes to be managed are processed with air shower, control the optical sensor to emit the ultraviolet light into the reception space.

Here, the optical sensor may be arranged on a suction flow path arranged on the inner side of the body and detect an allergen value included in the air inside the reception space.

Also, the optical sensor may include a suction hole that suctions the air inside the reception space, a filter arrangeable at some areas of the suction hole, a discharge hole that discharges air filtered by the filter, a light emitting part that emits the ultraviolet light to air not filtered by the filter among the air suctioned through the suction hole, a light transmitting part that receives a reflected light of the emitted light, a light collecting part that collects the light received from the light transmitting part, and a light receiving part that receives the collected light, and the processor may identify an allergen value of the clothes to be managed based on the intensity of the light received through the light receiving part.

Here, the light collecting part may be implemented as a heterogencously coupled light collecting mirror wherein an elliptical mirror and a spherical mirror are coupled.

Also, the processor may control the display to display information on the identified degree of contamination of the clothes to be managed, and after clothing management based on the recommended management course is completed according to a user instruction, control the optical sensor to re-emit the ultraviolet light into the reception space, and based on a reflected light of the re-emitted light being received through the optical sensor, re-identify the degree of contamination of the clothes to be managed based on an allergen value after the clothing management based on the intensity of the reflected light, and control the display to display information on the re-identified degree of contamination of the clothes to be managed.

Here, the clothing management apparatus may further include a communication interface, and the processor may transmit the information on the identified degree of contamination of the clothes to be managed and the information on the recommended management course to an external apparatus through the communication interface, and after the clothing management based on the recommended management course is completed, transmit the information on the identified degree of contamination of the clothes to be managed to the external device through the communication interface.

Here, the recommended management course may include at least one of a fine dust course, a sterilization course, a rapid course, or a powerful course.

Meanwhile, a control method of a clothing management apparatus according to an embodiment of the disclosure may include emitting an ultraviolet light through an optical sensor, based on an intensity of a reflected light received through the optical sensor due to the emitted light, identifying an allergen value of clothes to be managed, identifying a degree of contamination of the clothes to be managed based on the identified allergen value, and displaying information on a recommended management course corresponding to the clothes to be managed based on the identified degree of contamination.

Here, in the identifying the degree of contamination, one of a plurality of contamination levels may be identified based on the identified allergen value, and in the displaying the information on the recommended management course, based on the identified contamination level being smaller than a threshold level, a first management course may be recommended, and based on the identified contamination level being greater than or equal to the threshold level, a second management course may be recommended, and a sterilization treatment level of the second management course may be higher than a sterilization treatment level of the first management course.

Here, the control method may further include emitting air into a reception space through an air shower provided on an inner side of the body, and after the clothes to be managed are processed with air shower, emitting the ultraviolet light into the reception space.

Here, the optical sensor may be arranged on a suction flow path arranged on the inner side of the body and detect an allergen value included in the air inside the reception space.

Meanwhile, the optical sensor may include a suction hole that suctions the air inside the reception space, a filter that is provided in some areas of the suction hole, a discharge hole that discharges air filtered by the filter, a light emitting part that emits the ultraviolet light to air not filtered by the filter among the air suctioned through the suction hole, a light transmitting part that receives a reflected light of the emitted light, a light collecting part that collects the light received from the light transmitting part, and a light receiving part that receives the collected light, and identifying the allergen value may further include identifying an allergen value of the clothes to be managed based on the intensity of the light received through the light receiving part.

Here, the light collecting part may be implemented as a heterogencously coupled light collecting mirror wherein an elliptical mirror and a spherical mirror are coupled.

Here, the control method may further include displaying information on the identified degree of contamination of the clothes to be managed, and after clothing management based on the recommended management course is completed according to a user instruction, re-emitting the ultraviolet light into the reception space, and based on a reflected light of the re-emitted light being received through the optical sensor, re-identifying the degree of contamination of the clothes to be managed based on an allergen value after the clothing management based on the intensity of the reflected light, and displaying information on the re-identified degree of contamination of the clothes to be managed.

Here, the control method may further include transmitting the information on the identified degree of contamination of the clothes to be managed and the information on the recommended management course to an external apparatus through the communication interface, and after the clothing management based on the recommended management course is completed, transmitting the information on the identified degree of contamination of the clothes to be managed to the external device through the communication interface.

Meanwhile, the recommended management course may include at least one of a fine dust course, a sterilization course, a rapid course, or a powerful course.

Meanwhile, in a non-transitory computer-readable recording medium storing computer instructions to cause an electronic apparatus perform operations in case the instructions are executed by a processor of the electronic apparatus, the operations may include emitting an ultraviolet light through an optical sensor, based on an intensity of a reflected light received through the optical sensor due to the emitted light, identifying an allergen value of clothes to be managed based on the intensity of the reflected light, identifying a degree of contamination of the clothes to be managed based on the identified allergen value, and displaying information on a recommended management course corresponding to the clothes to be managed based on the identified degree of contamination.

DETAILED DESCRIPTION

Figure 1:
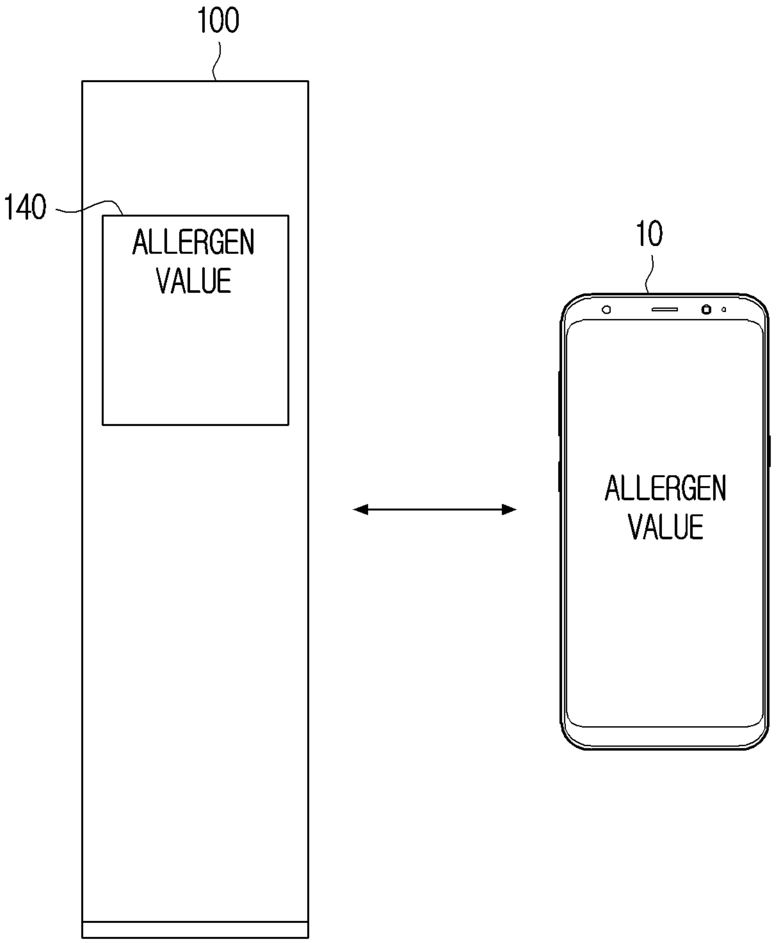
FIG. 1 is a diagram for illustrating a method of operating a clothing management apparatus according to an embodiment of the disclosure.

Hereinafter, the disclosure will be described in detail with reference to the accompanying drawings.

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent field or previous court decisions, or emergence of new technologies, etc. Further, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

In addition, in this specification, expressions such as "have," "may have," "include" and "may include" denote the existence of such characteristics (e.g.: elements such as numerical values, functions, operations, and components), and the expressions do not exclude the existence of additional characteristics.

Further, the expression "at least one of A and/or B" should be interpreted to mean any one of "A" or "B" or "A and B."

Also, the expressions "first," "second," and the like used in this specification may be used to describe various elements regardless of any order and/or degree of importance. Also, such expressions are used only to distinguish one element from another element, and are not intended to limit the elements.

In addition, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Further, singular expressions include plural expressions, unless defined obviously differently in the context. Also, in the disclosure, terms such as "include" or "consist of" should be construed as designating that there are such characteristics, numbers, steps, operations, elements, components, or a combination thereof in the specification, but not as excluding in advance the existence or possibility of adding one or more of other characteristics, numbers, steps, operations, elements, components, or a combination thereof.

In addition, in the disclosure, "a module" or "a part" may perform at least one function or operation, and may be implemented as hardware or software, or as a combination of hardware and software. Also, a plurality of "modules" or "parts" may be integrated into at least one module and implemented as at least one processor (not shown), excluding "a module" or "a part" that needs to be implemented as specific hardware.

Hereinafter, an embodiment of the disclosure will be described in more detail with reference to the accompanying drawings.

FIG. 1 is a diagram for illustrating a method of operating a clothing management apparatus according to an embodiment of the disclosure.

According to an embodiment, a clothing management apparatus 100 is provided to be able to refresh clothes stored in a reception space of a body (not shown). Specifically, the clothing management apparatus 100 may be formed to be able to remove contaminants attached on clothes, or remove dust adsorbed onto clothes, or smooth wrinkles generated on clothes.

If it is identified that clothes are stored in the clothing management apparatus 100, the clothing management apparatus 100 may receive the user's input, and execute a clothing management course corresponding thereto. For example, if the user's input corresponding to "a rapid course" is received, the clothing management apparatus 100 may operate a course corresponding thereto.

Meanwhile, according to an embodiment, the clothing management apparatus 100 may not only receive the user's input and execute a clothing management course corresponding thereto, but also identify an allergen value inside clothes through a sensor (not shown) existing in the clothing management apparatus 100, and provide information on the allergen value and a recommended management course to the user based on this. For example, the clothing management apparatus 100 may provide information on an allergen value and a recommended management course through a display 140 provided in the clothing management apparatus 100, and as another example, the clothing management apparatus 100 may control a communication interface (not shown) to display the aforementioned information through an external apparatus 10 such as a user terminal, etc.

Hereinafter, various embodiments of identifying an allergen value of clothes inside the clothing management apparatus 100, and providing information on the degree of contamination of the clothes and a recommended management course to the user based on this will be explained.

Figure 2:
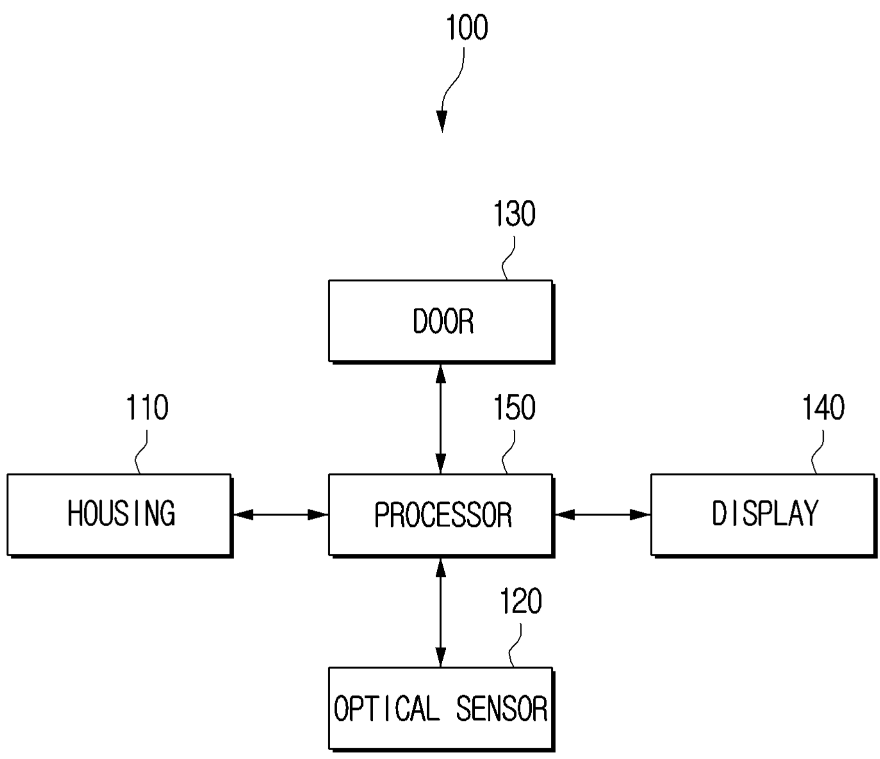
FIG. 2 is a block diagram for illustrating a configuration of a clothing management apparatus according to an embodiment of the disclosure.

FIG. 2 is a block diagram for illustrating a configuration of a clothing management apparatus according to an embodiment of the disclosure.

According to FIG. 2, the clothing management apparatus 100 may include a body 110, an optical sensor 120, a door 130, a display 140, and a processor 150.

The body 110 is a component that forms the exterior of the clothing management apparatus 100, and the body 110 may be formed in an approximately cuboid shape. The body 110 may include an outer case and an inner case provided inside the outer case. Here, the inner case may form a reception space wherein clothes are stored. Also, an optical sensor 120 may be provided between the outer case and the inner case of the body 110. That is, the optical sensor 120 may be provided on the outer side of the reception space and the inner side of the outer case. Also, a suction flow path may be provided between the outer case and the inner case of the body 110, and the optical sensor 120 may be provided on the suction flow path. Meanwhile, on the inner side of the body, an air shower may be additionally provided, and through this, air of a high pressure may be emitted to the inside of the body.

The optical sensor 120 is a sensor that emits a light, and in case the emitted light is reflected from a specific object, collects the reflected light and measures the intensity (unit: watt) of the collected light. For example, the specific object may be bioaerosol such as pollen, mold, and indoor germs, etc.

In this case, the optical sensor 120 may emit an ultraviolet light having a first wavelength range (e.g., 350 nm-370 nm) for collecting a reflected light for bioaerosol in the air. If the aforementioned ultraviolet light of the first wavelength range is irradiated on bioaerosol, a light of a second wavelength range (425 nm-600 nm) may be emitted from the bioaerosol. The optical sensor 120 can identify the intensity of the light of the second wavelength range among the collected reflective lights.

The optical sensor 120 may include a filter, a suction hole, a discharge hole, a light emitting part, a light transmitting part, a light collecting part, and a light receiving part. The optical sensor 120 may not only emit an infrared light but also an ultraviolet light. Detailed explanation in this regard will be described through FIG. 4A and FIG. 4B.

The door 130 is coupled to the body 110 such that it can provide an opening and/or a closing function for the reception space. According to an embodiment, the door 130 may be rotatably coupled to the body 110 such that it rotates on the front side of the reception space provided inside the body 110. On one side of the door 130, the display 140 may be provided. According to an embodiment, the display 140 may be provided on the front surface of the door 130.

The display 140 may be implemented as a display including self-luminous elements or a display including non-self-luminous elements and a backlight. For example, the display 140 may be implemented as displays in various forms such as a liquid crystal display (LCD), an organic light emitting diodes (OLED) display, light emitting diodes (LED), micro LED, mini LED, a plasma display panel (PDP), a quantum dot (QD) display, quantum dot light emitting diodes (QLED), etc. In the display 140, driving circuits that may be implemented in forms such as an a-si TFT, a low temperature poly silicon (LTPS) TFT, an organic TFT (OTFT), etc., and a backlight unit, etc. may also be included together. Meanwhile, the display 140 may also be implemented as a touch screen combined with a touch sensor, a flexible display, a rollable display, a 3D display, a display wherein a plurality of display modules are physically connected, etc. Further, the display 140 has a touch screen embedded therein, and may thus be implemented to execute a program by using a finger or a pen (e.g., a stylus pen). Meanwhile, the display 140 may be provided on one side of the door 130.

The processor 150 is electrically connected with the body 110, the optical sensor 120, the door 130, and the display 140, and controls the overall operations of the clothing management apparatus 100.

According to an embodiment, the processor 150 may be implemented as a digital signal processor (DSP) processing digital image signals, a microprocessor, a graphics processing unit (GPU), an artificial intelligence (AI) processor, a neural processing unit (NPU), and a time controller (T-CON). However, the disclosure is not limited thereto, and the processor 150 may include one or more of a central processing unit (CPU), a micro controller unit (MCU), a micro processing unit (MPU), a controller, an application processor (AP) or a communication processor (CP), and an ARM processor, or may be defined by the terms. Also, the processor 150 may be implemented as a system on chip (SoC) having a processing algorithm stored therein or large scale integration (LSI), or implemented in forms of an application specific integrated circuit (ASIC) and a field programmable gate array (FPGA).

First, according to an embodiment, the processor 150 may control the optical sensor 120 to emit an ultraviolet light. According to an embodiment, if power is applied to the clothing management apparatus and a user input corresponding to a clothing management course is received, the processor 150 may control the optical sensor 120 to emit an ultraviolet light. Here, the clothing management course may include at least one of a standard course, a fine dust course, a sterilization course, a rapid course, or a drying course.

According to another embodiment, the processor 150 may control the optical sensor 120 to emit an ultraviolet light after clothes to be managed are processed with air shower. Here, the air shower is an operation of removing dust of clothes located in the reception space as air of a high speed is emitted into the reception space through an air shower provided inside the body 110, and the air shower may be provided inside the body 110. For example, the processor 150 may control the air shower (not shown) to emit air into the reception space, and if it is identified that clothes to be managed located in the reception space were processed with air shower, the processor 150 may control the optical sensor 120 to emit an ultraviolet light into the reception space.

Afterwards, according to an embodiment, the processor 150 may receive a reflected light of the emitted light through the optical sensor 120, and identify the intensity of the reflected light based on this. According to an embodiment, in case a light was emitted to the inside of the body 110 through the optical sensor 120, the processor 150 may receive a reflected light of the emitted light through the optical sensor 120. The reflected light of the emitted light may be lights having various wavelength values, and the processor 150 may identify the intensity of a reflected light within a specific wavelength range (e.g., 425 nm-600 nm) among reflected lights. Meanwhile, when clothes to be managed are processed with air shower, the amount of allergen floating in the reception space increases more than the amount before the clothes were processed with air shower, and thus the correct allergen value can be identified. This will be described in detail through FIG. 4A.

Afterwards, according to an embodiment, if a reflected light of an emitted light is received through the optical sensor 120, the processor 150 may identify the allergen value of the clothes to be managed based on the intensity of the reflected light. Here, the allergen is a substance that causes allergies, and it may include microorganisms such as pollen, germs, and mold, etc. in the air. The aforementioned allergen is bioaerosol, and if it receives an ultraviolet light having a wavelength size of a specific range (e.g., 350 nm-370 nm), it emits an ultraviolet light having a wavelength size of a specific range (e.g., 425 nm-600 nm).

According to an embodiment, the processor 150 may identify the intensity of a reflected light of a specific wavelength range (e.g., 425 nm-600 nm) reflected from bioaerosol among reflected lights received through the optical sensor 120, and identify an allergen value corresponding to the identified intensity of the reflected light of the specific wavelength range. In this case, information on allergen values corresponding to intensities of reflected lights may have been stored in a memory (not shown) in advance, and as the intensity of a reflected light increases, the allergen value may also increase, but the disclosure is not limited thereto.

Afterwards, according to an embodiment, the processor 150 may identify the degree of contamination of the clothes to be managed based on the identified allergen value. Here, the degree of contamination means the degree that the clothes to be managed are contaminated, and for example, it may be a "normal" level, a "bad" level, and a "very bad" level, but is not limited thereto, and the levels can obviously be substituted with other linguistic expressions corresponding thereto.

According to an embodiment, the processor 150 may identify one of the plurality of contamination levels based on the size of the identified allergen value. For example, if it is identified that the identified allergen value is smaller than a first threshold size, the processor 150 may identify the degree of contamination as the "normal" level among the plurality of contamination levels. As another example, if it is identified that the identified allergen value is greater than or equal to a second threshold size, the processor 150 may identify the degree of contamination as the "very bad" level among the plurality of contamination levels. In this case, the first threshold size may be smaller than the second threshold size. In this case, the processor 150 may display information on the identified contamination level through the display 140.

Afterwards, according to an embodiment, the processor 150 may control the display 140 to display information on a recommended management course corresponding to the clothes to be managed (or, clothes inside the reception space) based on the identified degree of contamination. Here, the recommended management course may include at least one of the fine dust course, the sterilization course, the rapid course, the powerful course, or the drying course.

According to an embodiment, if the identified contamination level is smaller than a threshold level, the processor 150 may recommend a first management course, and if the identified contamination level is greater than or equal to the threshold level, the processor 150 may recommend a second management course. Here, the sterilization treatment level of the second management course may be higher than the sterilization treatment level of the first management course.

For example, in case the contamination level was identified as the "very bad" level which is greater than or equal to the "very bad" level which is the threshold level, the processor 150 may identify the recommended management course as "the sterilization course" which has a relatively high sterilization treatment level among the plurality of management courses, and control the display 140 to display information on "the sterilization course." In this case, the information on the degree of contamination (the "very bad" level) may also be displayed together with the information on the recommended management course. This will be described in detail through FIG. 7A to FIG. 7C.

As another example, in case the contamination level was identified as the "normal" level which is smaller than the "very bad" level which is the threshold level, the processor 150 may identify the recommended management course as "the rapid course" which has a relatively low sterilization treatment level among the plurality of management courses, and control the display 140 to display information on "the rapid course." However, the disclosure is not limited thereto, and the processor 150 can obviously recommend another course which is not "the rapid course."

Afterwards, according to an embodiment, the processor 150 may control a driver (not shown) such that a management course corresponding to a user instruction is operated.

Meanwhile, according to an embodiment, after clothing management based on a recommended management course is completed according to a user instruction, the processor 150 may re-identify the allergen value, and control the display 140 to display information on the re-identified degree of contamination based on this.

According to an embodiment, a case wherein it was identified that clothing management based on a recommended management course was completed is assumed. In this case, the processor 150 may control the optical sensor 120 to re-emit an ultraviolet light into the reception space, and when a reflected light of the re-emitted light is received through the optical sensor 120, the processor 150 may re-identify the degree of contamination of the clothes to be managed based on the allergen value after the clothing management based on the intensity of the reflected light. For example, in case the degree of contamination of the clothes to be managed before the clothing management was identified as "very bad," if the allergen value of the clothes was noticeably reduced after the operation of the clothing management course was completed, the processor 150 may identify the degree of contamination of the clothes as the "normal" level.

Afterwards, the processor 150 may control the display 140 to display information on the re-identified degree of contamination of the clothes to be managed.

Meanwhile, according to an embodiment, the processor 150 may transmit information on an identified degree of contamination and information on a recommended management course to an external apparatus (not shown) through the communication interface (not shown). Here, the external apparatus (not shown) may be a user terminal and a portable PC, but is not limited thereto.

According to an embodiment, a case wherein the degree of contamination of the clothes to be managed was identified as "very bad" is assumed. The processor 150 may transmit information on the degree of contamination and information on "the sterilization course" as a recommended management course to a user terminal through the communication interface (not shown). Afterwards, if it is identified that clothing management based on the recommended management course was completed, the processor 150 may re-identify the degree of contamination of the clothes to be managed, and transmit information on the re-identified degree of contamination to the user terminal through the communication interface (not shown).

According to the aforementioned various embodiments, an allergen value of clothes can be detected, and a recommended management course can be provided to the user based on this. Accordingly, effective management for the allergen in the clothes becomes possible, and the user's satisfaction can be improved.

Figure 3:
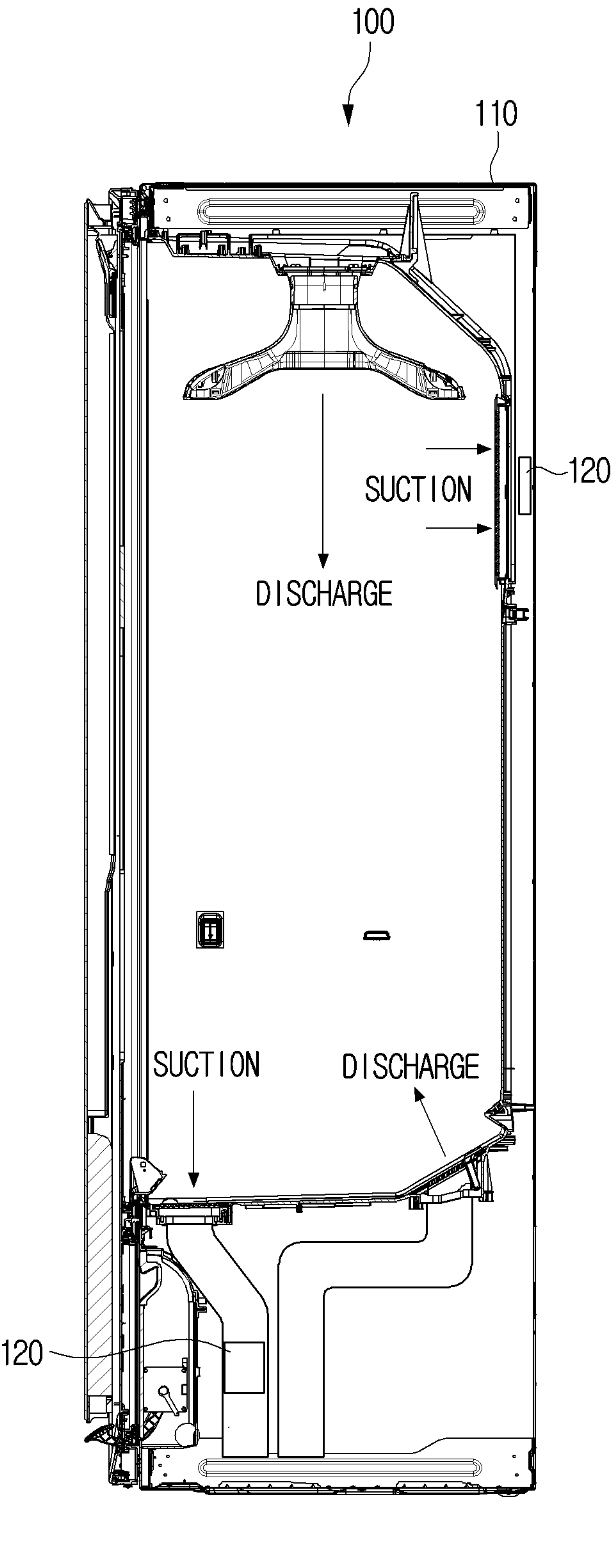
FIG. 3 is a diagram for illustrating a location of an optical sensor according to an embodiment of the disclosure.

FIG. 3 is a diagram for illustrating a location of an optical sensor according to an embodiment of the disclosure.

According to FIG. 3, according to an embodiment, the optical sensor 120 may be arranged on a suction flow path located on the outer side of the reception space (or, the inner side of the external case), and detect an allergen value included in the air inside the reception space. According to an example, the optical sensor 120 may be arranged on a suction flow path located in the upper part of the body 110. According to another example, the optical sensor 120 may be arranged on a suction flow path located in the lower part of the body 110.

As the optical sensor 120 is arranged on the suction flow path, air can be filtered, and at the same time, the allergen value inside the body 110 can be identified. However, the disclosure is not limited thereto, and the optical sensor 120 can obviously be arranged in another location inside the body 110 which is not the suction flow path.

Figure 4A:
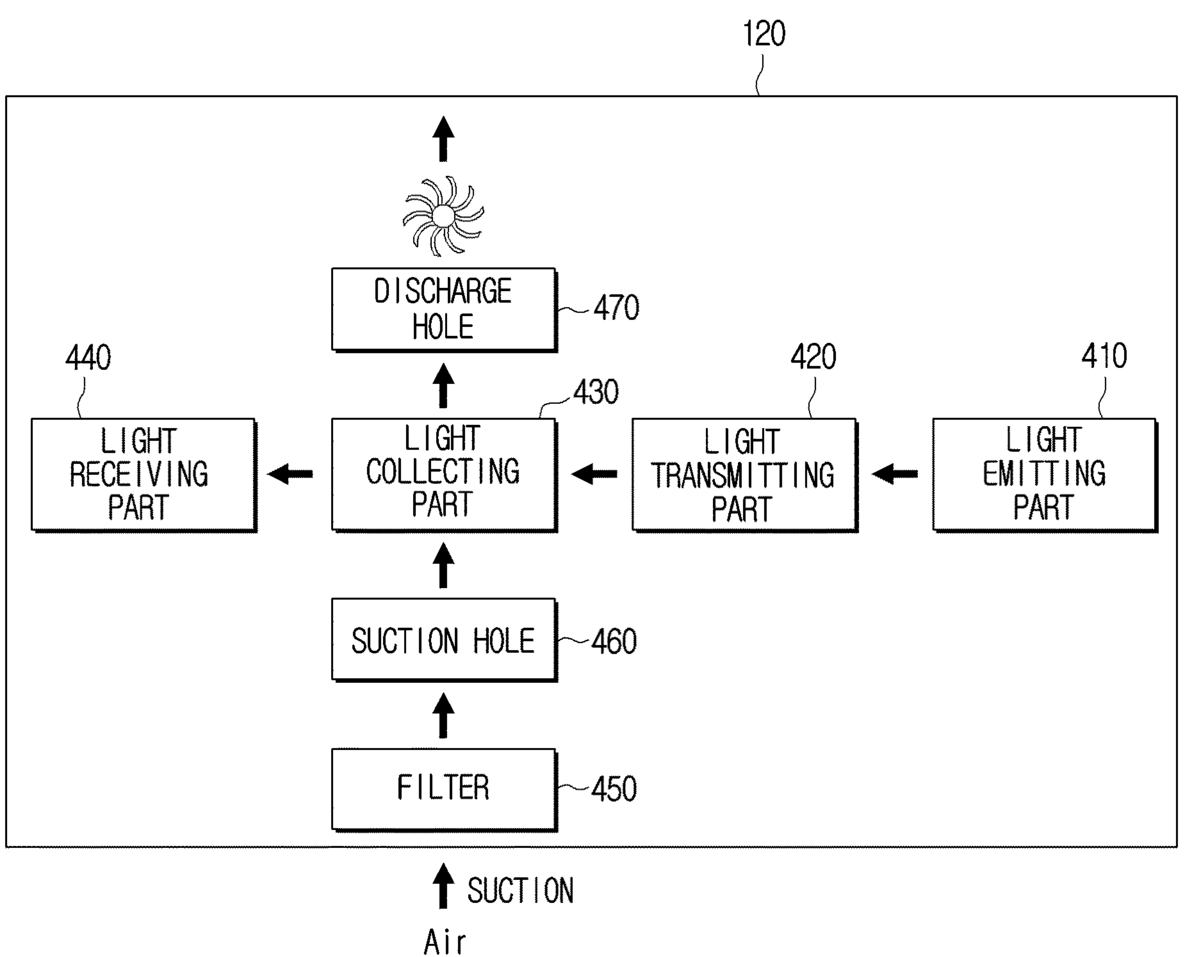
FIG. 4A is a diagram for illustrating a configuration of an optical sensor 120 according to an embodiment.

FIG. 4A is a diagram for illustrating a configuration of the optical sensor 120 according to an embodiment.

According to FIG. 4A, according to an embodiment, the optical sensor 120 may include a suction hole 460 that suctions the air inside the reception space, a filter 450 that is provided in some areas of the suction hole 460, a discharge hole 470 that discharges air filtered by the filter 450, a light emitting part 410 that emits an ultraviolet light to air not filtered by the filter 450 among the air suctioned through the suction hole 460, a light transmitting part 420 that receives a reflected light of the emitted light, a light collecting part 430 that collects the light received from the light transmitting part 420, and a light receiving part 440 that receives the collected light.

According to an embodiment, first, a light may be emitted from the light emitting part 410. The emitted light may be reflected from an object located inside the body 110 (e.g., an object inside the reception space or bioaerosol inside the air), and a reflected light may be received through the light transmitting part 420. The light transmitting part 420 may not only receive the reflected light but also analyze the wavelength of the received reflected light, and identify a reflected light within a specific wavelength range. For example, the light transmitting part 420 may identify a light within a wavelength range (e.g., 425 nm-600 nm) of a light reflected from bioaerosol.

Afterwards, the received reflected light may be collected through the light collecting part 430. According to an embodiment, the light collecting part 430 may be implemented as a heterogeneously coupled light collecting mirror wherein an elliptical mirror and a spherical mirror are coupled.

The elliptical mirror means a mirror in an oval form (or, an ellipsoid), and in case a light source is located on a first focal point included by the oval, a light emitted from the light source located on the first focal point converges into a second focal point. Through this, a reflected light can be effectively collected. Meanwhile, the spherical mirror is a mirror in a spherical form, and for example, it may be a convex mirror or a concave mirror. In case a light is emitted to the spherical mirror, the light may converge into the focal point of the spherical mirror. According to an embodiment, the light collecting part 430 may be in a form of a heterogeneously coupled light collecting mirror wherein the aforementioned elliptical mirror and spherical mirror are coupled, and accordingly, a light received from the light transmitting part 420 may be collected.

The light collected through the light collecting part 430 may be received through the light receiving part 440. The optical sensor 120 may identify the intensity of the light received through the light receiving part 440, and according to an embodiment, the optical sensor 120 may identify only the intensity of a light of a specific wavelength range (e.g., 425 nm-600 nm) identified through the light transmitting part 420. However, the disclosure is not limited thereto, and according to another example, the light receiving part 440 may identify a light within a wavelength range (e.g., 425 nm-600 nm) of a light reflected from bioaerosol, and identify the intensity of the identified light.

Afterwards, the processor 150 may identify an allergen value of the clothes to be managed based on the intensity of the light received through the light receiving part 440. According to an embodiment, the processor 150 may identify the intensity of a light of a specific wavelength range (425 nm-600 nm) among the lights received through the light receiving part 440, and identify an allergen value corresponding to the identified intensity of the light. In this case, the allergen value corresponding to the identified intensity of the light may have been stored in the memory (not shown) in advance.

Figure 4B:
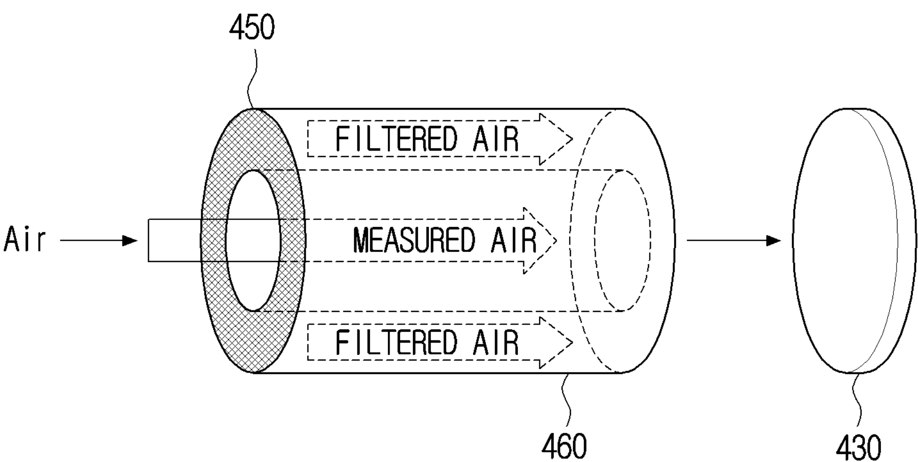
FIG. 4B is a diagram for illustrating a method of suctioning and discharging air according to an embodiment.

FIG. 4B is a diagram for illustrating a method of suctioning and discharging air according to an embodiment.

According to FIG. 4B, according to an embodiment, first, air suctioned into the optical sensor 120 goes through the filter 450 and the suction hole 460. In this case, the air may be filtered through a sheath flow system. A sheath flow system means that, in case air suctioned into the optical sensor 120 passes through the filter 450, only air passing through some areas of the suction hole 460 is filtered, and the remaining air is not filtered.

In this case, the processor 150 receives a reflected light reflected from the measured air excluding the filtered air through the optical sensor 120. For example, if a light is emitted to the measured air that went through the filter 450 and the suction hole 460, a reflected light goes toward the light collecting part 430 via the light transmitting part 420. The light collected at the light collecting part 430 is received at the light receiving part 440, and the processor 150 may identify an allergen value based on the intensity of the light received at the light receiving part 440.

As described above, as air is filtered through the sheath flow system, contamination of the parts that measure a light such as the light emitting part 410, the light transmitting part 420, the light collecting part 430, and the light receiving part 440 of the optical sensor 120 can be prevented, and as a light is emitted to air that was not filtered, a more correct allergen value can be identified.

Figure 5:
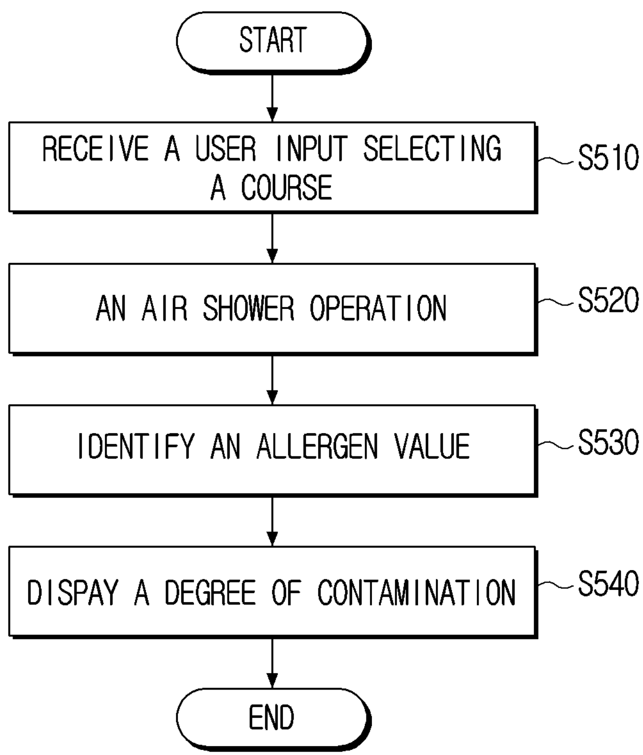
FIG. 5 is a flow chart for illustrating a method of operating a clothing management apparatus according to an embodiment of the disclosure.

FIG. 5 is a flow chart for illustrating a method of operating a clothing management apparatus according to an embodiment of the disclosure.

According to FIG. 5, first, according to an embodiment, the processor 150 may receive a user input selecting a clothing management course in operation S510. The clothing management course may be, for example, the rapid course, the fine dust course, the sterilization course, or the powerful course, but is not limited thereto, and the user input may be received through a user interface (not shown). As another example, the user input may be received from an external apparatus (not shown), e.g., a user terminal through the communication interface (not shown).

Afterwards, when a user input selecting a clothing management course is received, the processor 150 may execute an air shower operation and emit air into the reception space. For example if a user input corresponding to "the fine dust course" is received, the processor 150 may execute the air shower operation through the air shower.

When the air shower operation is completed, the processor 150 may identify an allergen value in operation S530. For example, if an ultraviolet light is emitted through the optical sensor 120 after the air shower operation is completed, and a reflected light of the emitted light is received through the optical sensor 120, the processor 150 may identify the allergen value of the clothes to be managed based on the intensity of the received reflected light.

Afterwards, the processor 150 may identify the degree of contamination of the clothes to be managed based on the identified allergen value in operation S540. For example, if the identified allergen value is identified to be greater than or equal to a second threshold value, the processor 150 may identify the contamination level as "very bad."

Figure 6A:
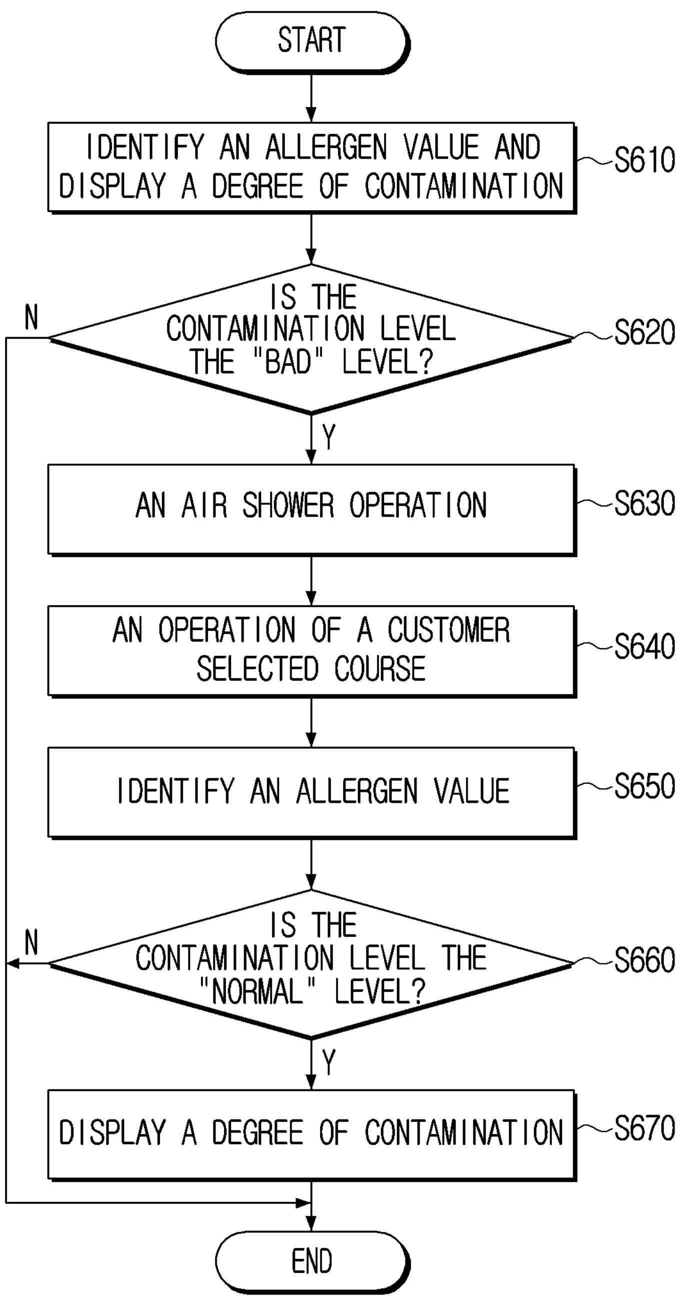
FIG. 6A is a flow chart for illustrating a method of re-identifying a degree of contamination according to an embodiment of the disclosure.
Figure 6B:
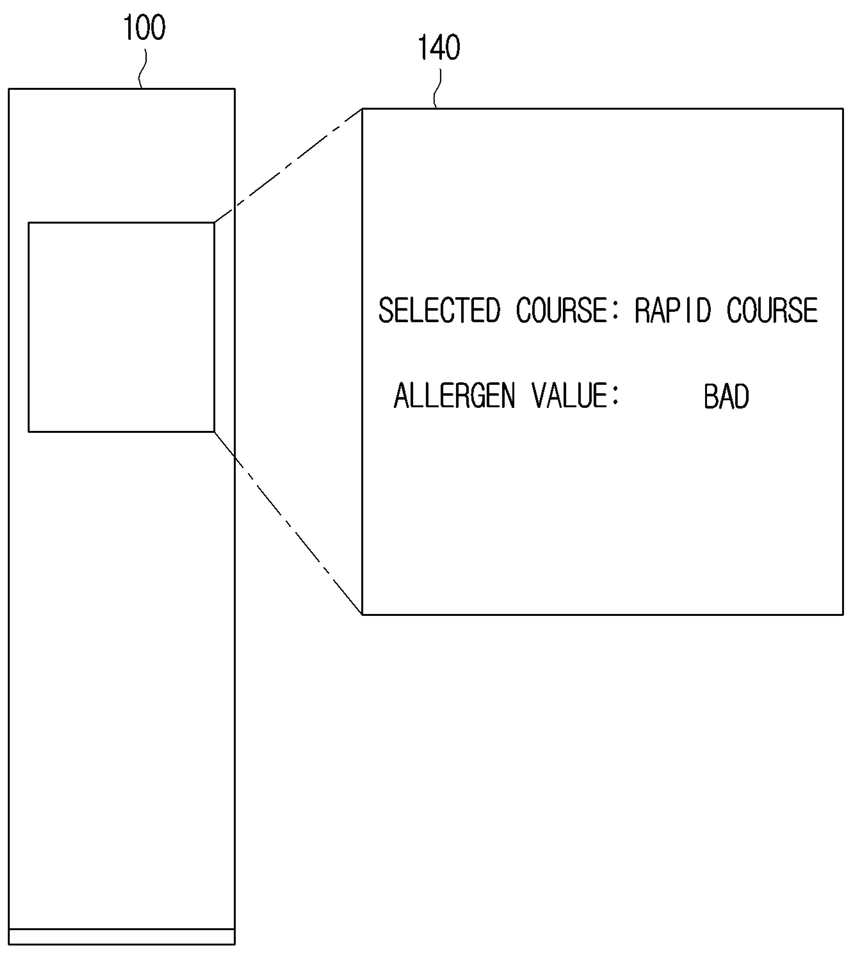
FIG. 6B is a diagram for illustrating a method of re-identifying a degree of contamination according to an embodiment of the disclosure.

FIG. 6A and FIG. 6B are a flow chart and a diagram for illustrating a method of re-identifying a degree of contamination according to an embodiment of the disclosure.

According to FIG. 6A, according to an embodiment, a case wherein the degree of contamination of the clothing management apparatus was identified as illustrated in FIG. 5 is assumed. If a user input selecting a course is received, and an air shower operation is completed, the processor 150 may identify an allergen value and identify a degree of contamination corresponding thereto, and display it in operation S610. In this case, the processor 150 may display information on the user's selected course and the allergen value through the display 140. For example, as illustrated in FIG. 6B, if the user selects the rapid course, and the degree of contamination corresponding to the identified allergen value is identified as "bad," the processor 150 may display the information on the user's selected course and the information on the degree of contamination corresponding to the allergen value through the display 140, as illustrated in FIG. 6B. In this case, in case the information on the degree of contamination is displayed, the information may be displayed as "the allergen value" through the display 140 as illustrated in FIG. 6B, but the disclosure is not limited thereto, and it may also be displayed as "the degree of contamination."

Afterwards, the processor 150 may identify whether the contamination level is the "bad" level in operation S620, and if the contamination level is identified as the "bad" level, the processor 150 may execute the air shower operation in operation S630. Then, the processor 150 may operate a customer selected course corresponding to a user input selecting a course in operation S640. For example, if a user input corresponding to "the rapid course" is received, the processor 150 may execute a rapid course operation.

If the operation of the customer selected course is completed, the processor 150 may re-identify the allergen value in operation S650. In this case, the re-identified allergen value may be different from the allergen value before the operation of the customer selected course.

Afterwards, the processor may identify the degree of contamination corresponding to the re-identified allergen value, and re-identify whether the identified degree of contamination is the "normal" level in operation S660. If it is identified that the re-identified degree of contamination is the "normal" level, the processor 150 may display the re-identified degree of contamination through the display 140. In this case, the information illustrated in FIG. 6B may be updated to the information on the re-identified degree of contamination.

Figure 7A:
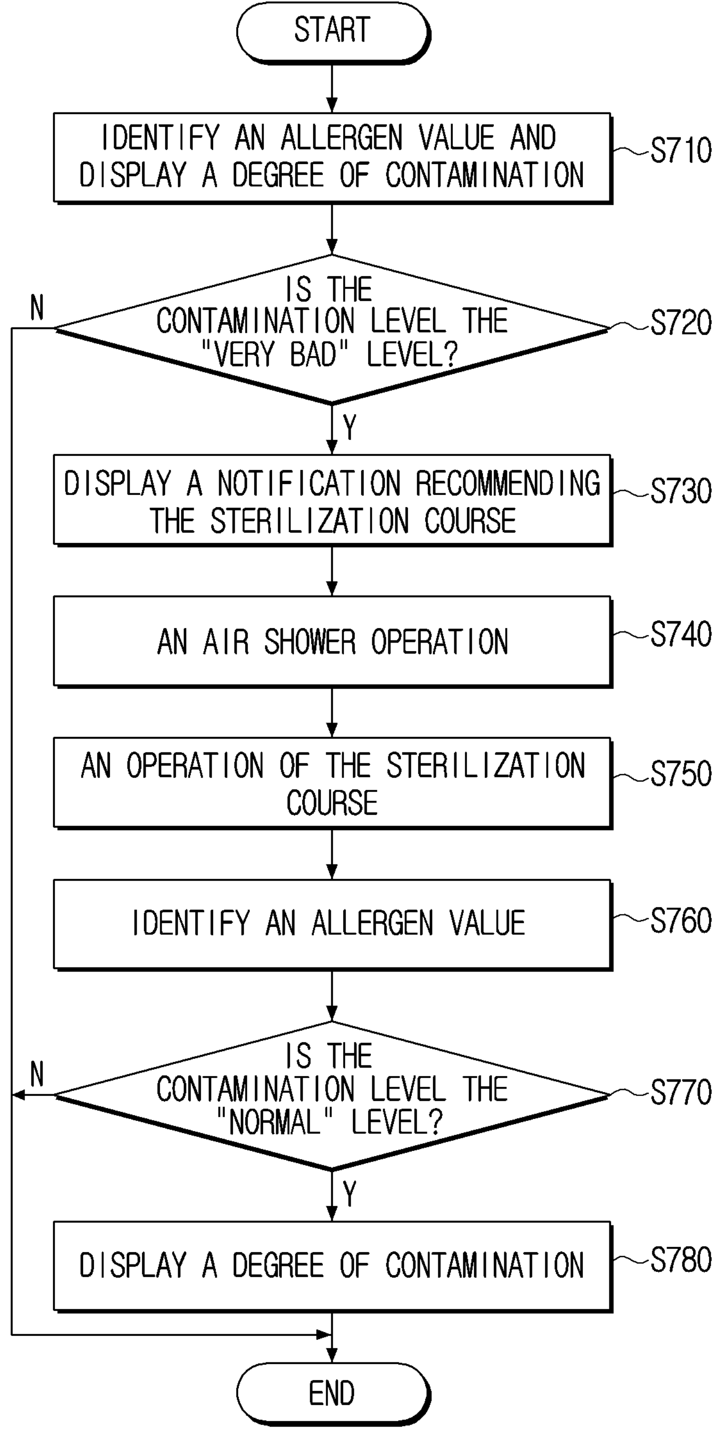
FIG. 7A is a flow chart for illustrating a method of recommending a course according to an embodiment of the disclosure.
Figure 7B:
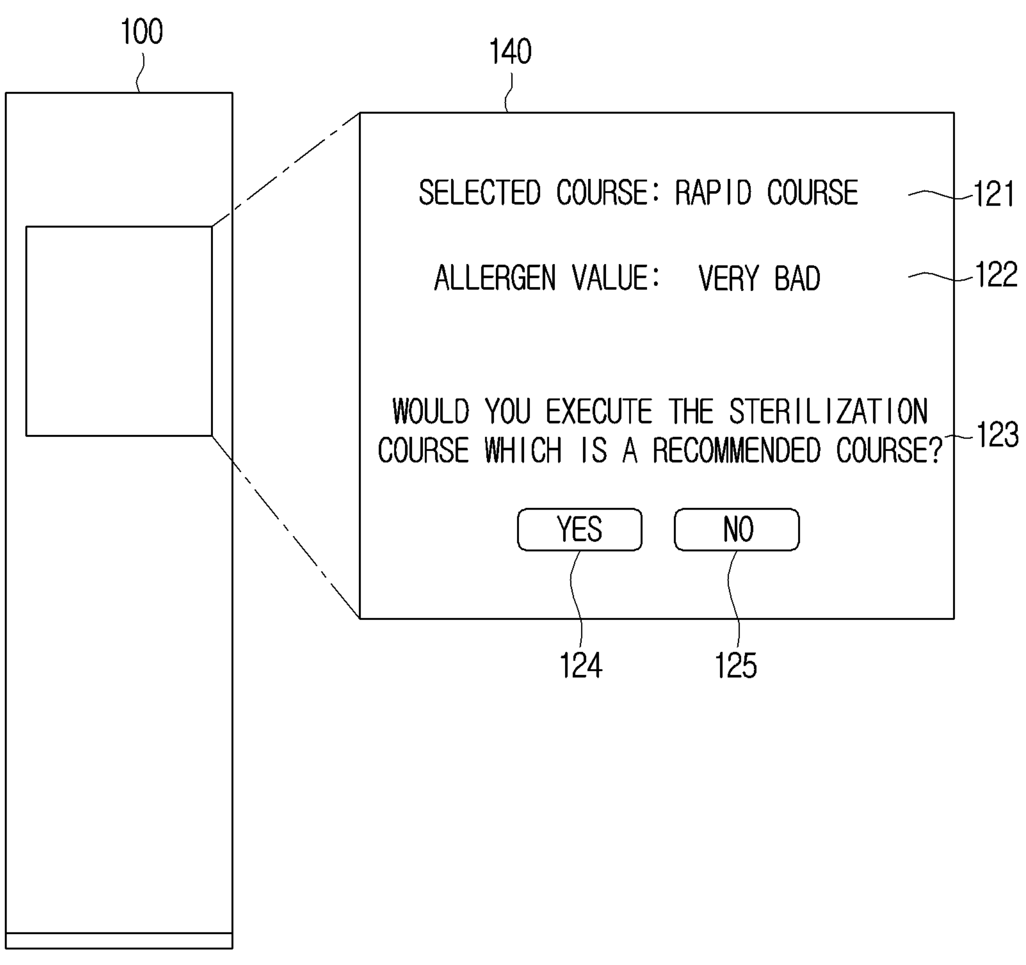
FIG. 7B is a diagram for illustrating a method of recommending a course according to an embodiment of the disclosure.
Figure 7C:
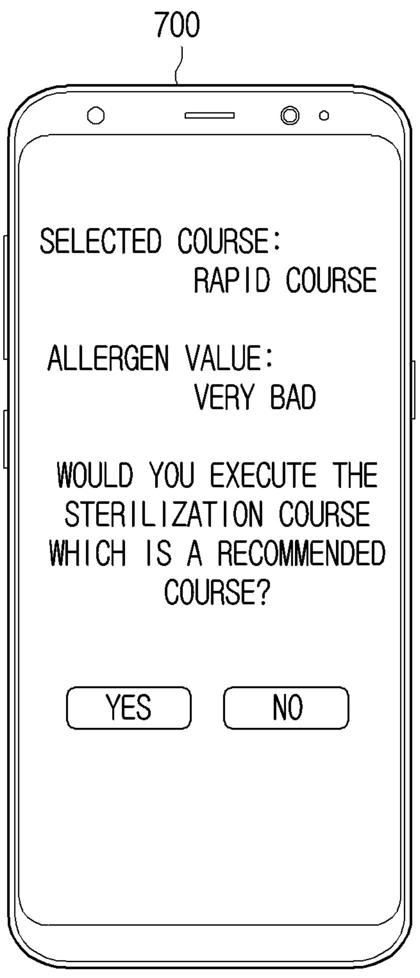
FIG. 7C is a diagram for illustrating a method of recommending a course according to an embodiment of the disclosure.

FIG. 7A to FIG. 7C are diagrams for illustrating a method of recommending a course according to an embodiment of the disclosure.

According to FIG. 7A, according to an embodiment, a case wherein the degree of contamination of the clothing management apparatus was identified as illustrated in FIG. 5 is assumed. If a user input selecting a course is received, and an air shower operation is completed, the processor 150 may identify an allergen value, and identify a degree of contamination corresponding thereto and display it in operation S710.

Afterwards, the processor 150 may identify whether the contamination level is the "very bad" level in operation S720, and if the contamination level is identified as the "very bad" level, the processor 150 may display a notification recommending the sterilization course through the display 140 in operation S730.

For example, as illustrated in FIG. 7B, in case the contamination level is identified as "the very bad" level, and the user's selected course is the rapid course but not the sterilization course, the processor 150 may display the user's selected course 121 and the contamination level 122 through the display 140. Also, as the contamination level is identified as "the very bad" level, the processor 150 may display "Would you execute the sterilization course which is the recommended course?" 123 corresponding to the notification recommending the sterilization course through the display 140. In this case, the processor 150 may receive user inputs 124, 125 corresponding to whether to execute the sterilization course.

Afterwards, the processor 150 may execute the air shower operation in operation S740. Then, if a user input for executing the sterilization course is received, the processor 150 may operate the sterilization course in operation S750. If it is identified that the operation of the sterilization course was completed, the processor 150 may re-identify the allergen value in operation S760.

Afterwards, the processor 150 may re-identify whether the contamination level corresponding to the re-identified allergen value is the "normal" level in operation S770, and if it is identified that the re-identified degree of contamination is the "normal" level, the processor 150 may display the re-identified degree of contamination through the display 140. In this case, the information illustrated in FIG. 7B may be updated to the information on the re-identified degree of contamination, and the processor 150 may display the updated information through the display 140.

Meanwhile, as illustrated in FIG. 7C, information on a selected course, information on a contamination level, and a notification recommending the sterilization course may be displayed on an external apparatus (not shown) through the communication interface (not shown). For example, in case the contamination level is identified as the "very bad" level, and the user's selected course is the rapid course but not the sterilization course, the processor 150 may control the communication interface (not shown) such that the user's selected course 121, information on the contamination level 122, and a notification 123 recommending a course are displayed on the user terminal 700.

Accordingly, the user can be provided with a recommended course according to an allergen value and a degree of contamination corresponding thereto, and thus the user's satisfaction is improved.

Figure 8:
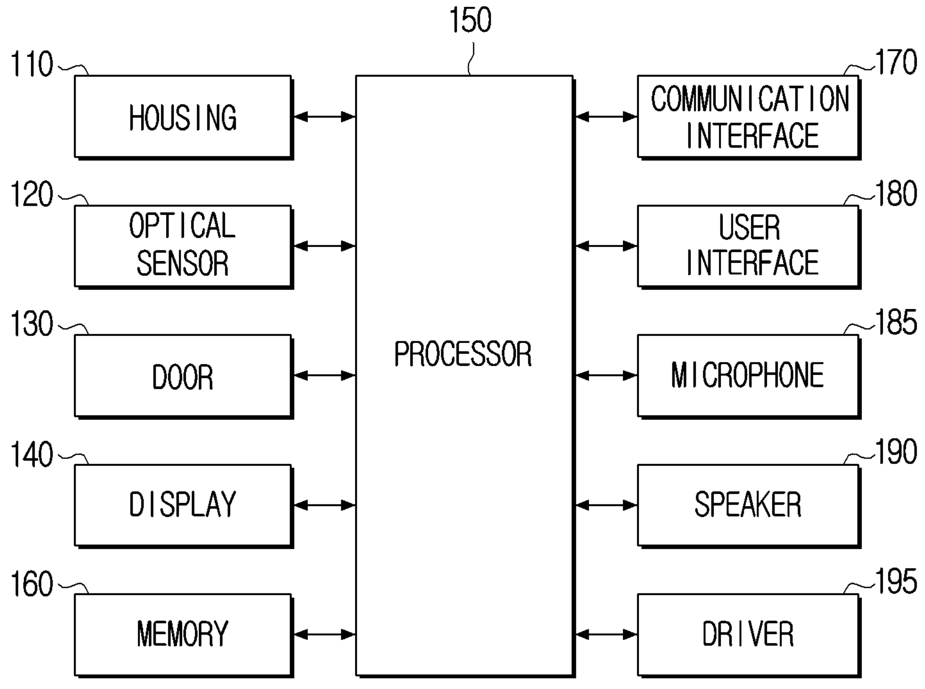
FIG. 8 is a diagram for illustrating a detailed configuration of a clothing management apparatus according to an embodiment of the disclosure.

FIG. 8 is a diagram for illustrating a detailed configuration of a clothing management apparatus according to an embodiment of the disclosure.

According to FIG. 8, the clothing management apparatus 100' may include a body 110, an optical sensor 120, a door 130, a display 140, a processor 150, a memory 160, a communication interface 170, a user interface 180, a microphone 185, a speaker 190, and a driver 195. Among the components illustrated in FIG. 8, regarding components overlapping with the components illustrated in FIG. 2, detailed explanation will be omitted.

The memory 160 may store data necessary for the various embodiments of the disclosure. The memory 160 may be implemented in the form of a memory embedded in the clothing management apparatus 100', or implemented in the form of a memory that can communicate with (or that can be attached to or detached from) the clothing management apparatus 100' according to the usage of stored data. For example, in the case of data for operating the clothing management apparatus 100', the data may be stored in a memory embedded in the clothing management apparatus 100', and in the case of data for an extension function of the clothing management apparatus 100', the data may be stored in a memory that can communicate with the clothing management apparatus 100'. Meanwhile, in the case of a memory embedded in the clothing management apparatus 100', the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). Also, in the case of a memory that can communicate with the clothing management apparatus 100', the memory may be implemented in forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

According to an embodiment, the memory 160 may be implemented as a single memory that stores data generated in various operations according to the disclosure. However, according to another embodiment, the memory 160 may be implemented to include a plurality of memories that respectively store different types of data, or respectively store data generated in different steps.

The communication interface 170 may perform communication with a network apparatus (not shown) such as another user terminal, etc.

According to an embodiment, the communication interface 170 may include a wireless communication module, e.g., a Wi-Fi module, a Bluetooth module, etc. However, the disclosure is not limited thereto, and the communication interface 170 may perform communication according to various wireless communication standards such as Zigbee, 3rd Generation (3G), 3rd Generation Partnership Project (3GPP), Long Term Evolution (LTE), LTE Advanced (LTE-A), 4th Generation (4G), 5th Generation (5G), etc., and an infrared Data Association (IrDA) technology, etc. other than the aforementioned communication methods.

The user interface 180 is a component for the clothing management apparatus 100' to perform interaction with the user. For example, the user interface 180 may include at least one of a touch sensor, a motion sensor, a button, a jog dial, a switch, a microphone, or a speaker, but is not limited thereto.

The microphone 185 may mean a module that obtains a sound and converts the sound into an electric signal, and it may be a condenser microphone, a ribbon microphone, a moving coil microphone, a piezoelectric element microphone, a carbon microphone, and a micro electro mechanical system (MEMS) microphone. Also, the microphone 185 may be implemented by methods such as a non-directional method, a bi-directional method, a uni-directional method, a sub cardioid method, a super cardioid method, and a hyper cardioid method.

The speaker 190 may consist of a tweeter for reproducing sounds of high-pitched ranges, a mid-range for reproducing sounds of mid-pitched ranges, a woofer for reproducing sounds of low-pitched ranges, a sub-woofer for reproducing sounds of extreme low-pitched ranges, an enclosure for controlling resonances, and a crossover network dividing frequencies of electric signals input into the speaker 190 by each band.

The speaker 190 may output an acoustic signal to the outside of the clothing management apparatus 100'. The speaker 190 may output reproduction of multimedia, reproduction of recording, various types of notification sounds, voice messages, etc. The clothing management apparatus 100' may include an audio output apparatus such as the speaker 190, but may also include an output apparatus such as an audio output terminal. In particular, the speaker 190 may provide acquired information, information processed·produced based on the acquired information, a response result or an operation result for a user voice, etc. in voice forms.

The driver 195 is a device that can drive the clothing management apparatus 100'. The driver 195 may adjust an operation direction and an operation speed according to control by the processor 150, and the driver 195 according to an embodiment may include a power generation device (e.g.: a gasoline engine, a diesel engine, a liquefied petroleum gas (LPG) engine, an electric motor, etc. according to the used fuel (or the energy source)) that generates power for the clothing management apparatus 100' to operate.

Figure 9:
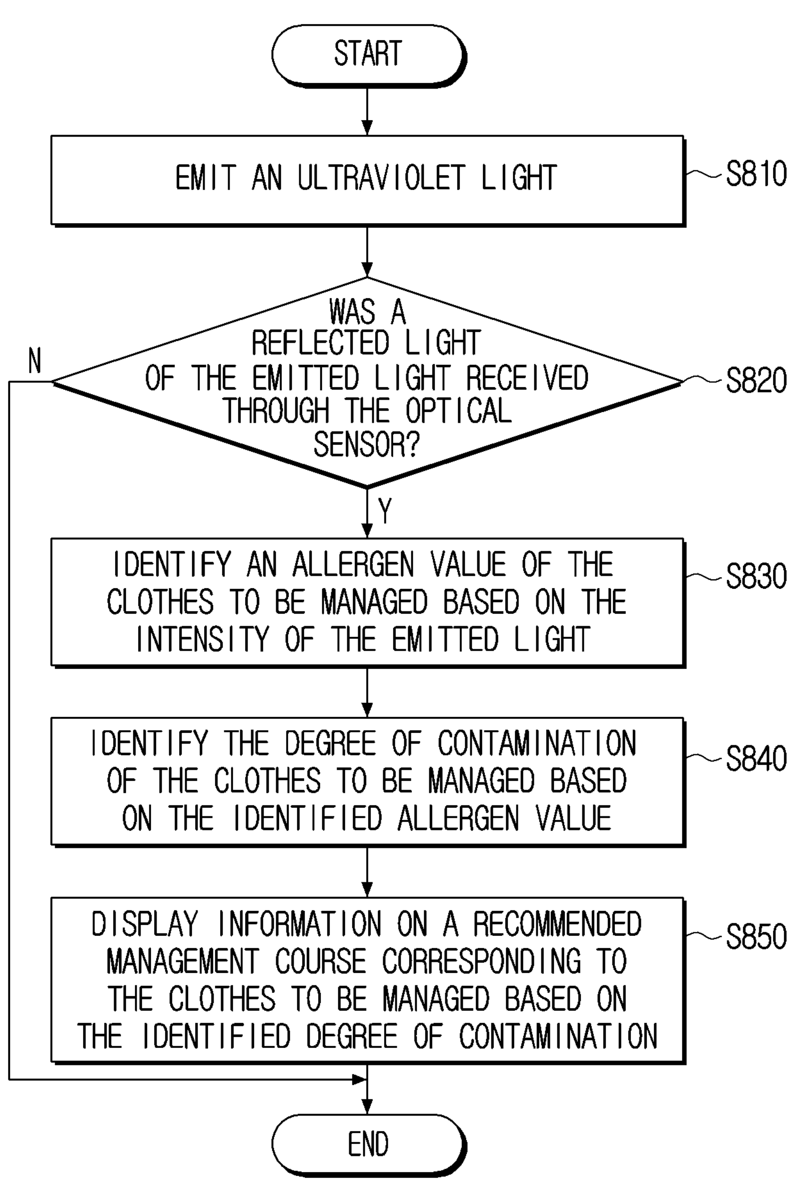
FIG. 9 is a flow chart for illustrating a control method of a clothing management apparatus according to an embodiment of the disclosure.

FIG. 9 is a flow chart for illustrating a control method of a clothing management apparatus according to an embodiment of the disclosure.

According to the control method of the clothing management apparatus illustrated in FIG. 9, first, an ultraviolet light is emitted through the optical sensor in operation S810. Here, the operation S810 may further include emitting air into the reception space through an air shower provided on an inner side of the body, and after the clothes to be managed are processed with air shower, emitting the ultraviolet light into the reception space.

Afterwards, it is identified whether a reflected light of the emitted light is received through the optical sensor in operation S820.

Afterwards, the allergen value of the clothes to be managed is identified based on the intensity of the reflected light in operation S830.

Afterwards, the degree of contamination of the clothes to be managed is identified based on the identified allergen value in operation S840. Here, in the operation S840, one of a plurality of contamination levels may be identified based on the identified allergen value, and in the operation S850, based on the identified contamination level being smaller than a threshold level, a first management course may be recommended, and based on the identified contamination level being greater than or equal to the threshold level, a second management course may be recommended, and a sterilization treatment level of the second management course may be higher than a sterilization treatment level of the first management course.

Afterwards, information on a recommended management course corresponding to the clothes to be managed is displayed based on the identified degree of contamination in operation S850.

The optical sensor may be arranged on a suction flow path located on the inner side of the body, and detect an allergen value included in the air inside the reception space.

Meanwhile, the optical sensor may include a suction hole that suctions the air inside the reception space, a filter that is provided in some areas of the suction hole, a discharge hole that discharges air filtered by the filter, a light emitting part that emits the ultraviolet light to air not filtered by the filter among the air suctioned through the suction hole, a light transmitting part that receives a reflected light of the emitted light, a light collecting part that collects the light received from the light transmitting part, and a light receiving part that receives the collected light. Also, the operation S830 may further include identifying an allergen value of the clothes to be managed based on the intensity of the light received through the light receiving part. Here, the light collecting part may be implemented as a heterogeneously coupled light collecting mirror wherein an elliptical mirror and a spherical mirror are coupled.

Meanwhile, the control method may further include displaying information on the identified degree of contamination of the clothes to be managed, and after clothing management based on the recommended management course is completed according to a user instruction, re-emitting the ultraviolet light into the reception space, and based on a reflected light of the re-emitted light being received through the optical sensor, re-identifying the degree of contamination of the clothes to be managed based on an allergen value after the clothing management based on the intensity of the reflected light, and displaying information on the re-identified degree of contamination of the clothes to be managed.

Also, the control method may further include transmitting the information on the identified degree of contamination of the clothes to be managed and the information on the recommended management course to an external apparatus through the communication interface, and after the clothing management based on the recommended management course is completed, transmitting the information on the identified degree of contamination of the clothes to be managed to the external device through the communication interface. Here, the recommended management course may include at least one of a fine dust course, a sterilization course, a rapid course, or a powerful course.

According to the aforementioned various embodiments, an allergen value of clothes can be detected, and information on the degree of contamination of the clothes and a recommended management course can be provided to the user based on this. Accordingly, effective management for the allergen in the clothes becomes possible, and the user's satisfaction can be improved.

Meanwhile, methods according to the aforementioned various embodiments of the disclosure may be implemented in forms of applications that can be installed on conventional electronic apparatuses. Alternatively, the methods according to the aforementioned various embodiments of the disclosure may be performed by using an artificial neural network based on deep learning (or a deep artificial neural network), i.e., a learning network model. Also, the methods according to the aforementioned various embodiments of the disclosure may be implemented just with software upgrade, or hardware upgrade for a conventional electronic apparatus. In addition, the aforementioned various embodiments of the disclosure may also be performed through an embedded server provided on an electronic apparatus, or an external server of an electronic apparatus.

Meanwhile, according to an embodiment of the disclosure, the aforementioned various embodiments may be implemented as software including instructions stored in machine-readable storage media, which can be read by machines (e.g.: computers). Here, the machines refer to apparatuses that call instructions stored in a storage medium, and can operate according to the called instructions, and the apparatuses may include a display apparatus according to the aforementioned embodiments (e.g.: a display apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment, the methods according to the aforementioned various embodiments may be provided while being included in a computer program product. A computer program product refers to a product, and it can be traded between a seller and a buyer. A computer program product may be distributed in the form of a storage medium that is readable by machines (e.g.: a compact disc read only memory (CD-ROM)), or may be distributed on-line through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components (e.g.: a module or a program) according to the aforementioned various embodiments may consist of a singular object or a plurality of objects. Also, among the aforementioned corresponding sub components, some sub components may be omitted, or other sub components may be further included in the various embodiments. Alternatively or additionally, some components (e.g.: a module or a program) may be integrated as an object, and perform functions that were performed by each of the components before integration identically or in a similar manner. Further, operations performed by a module, a program, or other components according to the various embodiments may be executed sequentially, in parallel, repetitively, or heuristically. Or, at least some of the operations may be executed in a different order or omitted, or other operations may be added.

Also, while preferred embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims. Further, it is intended that such modifications are not to be interpreted independently from the technical idea or prospect of the disclosure.

What is claimed is:

1. A clothing management apparatus comprising:
a body including a reception space to accommodate clothes to be managed;
an optical sensor;
a door coupleable to the body;
a display arrangeable on one side of the door; and
a processor configured to:
control the optical sensor to emit an ultraviolet light,
identify an allergen value of the clothes to be managed based on an intensity of a reflected light within a wavelength range, due to the emitted ultraviolet light,
identify a degree of contamination of the clothes to be managed based on the identified allergen value being at a contamination level among a plurality of contamination levels, and
control the display to display information on a recommended management course corresponding to the clothes to be managed based on the identified degree of contamination.

2. The clothing management apparatus of claim 1, wherein the optical sensor is arranged on an inner side of the body and an outer side of the reception space,
wherein the processor is configured to:
based on the identified contamination level being less than a threshold level, recommend a first management course, and
based on the identified contamination level being greater than or equal to the threshold level, recommend a second management course, and
wherein a sterilization treatment level of the second management course provides higher sterilization than a sterilization treatment level of the first management course.

3. The clothing management apparatus of claim 1, further comprising:
an air shower arrangeable on an inner side of the body,
wherein the processor is configured to:
control the air shower to emit air into the reception space, and
after the clothes to be managed are processed with air shower, control the optical sensor to emit the ultraviolet light into the reception space.

4. The clothing management apparatus of claim 3,
wherein the optical sensor is arranged on a suction flow path arranged on the inner side of the body and detects an allergen value in air inside the reception space.

5. The clothing management apparatus of claim 3,
wherein the optical sensor comprises:
a suction hole that suctions air inside the reception space;
a filter, arrangeable at some areas of the suction hole, to filter the air;
a discharge hole that discharges air filtered by the filter;
a light emitting part that emits the ultraviolet light to air not filtered by the filter among the air suctioned through the suction hole;
a light transmitting part that receives the reflected light of the emitted light;
a light collecting part that collects the light received from the light transmitting part; and
a light receiving part that receives the collected light, and the processor is configured to identify the allergen value of the clothes to be managed based on the intensity of the light received through the light receiving part.

6. The clothing management apparatus of claim 5, wherein the light collecting part is implemented as a heterogeneously coupled light collecting mirror, an elliptical mirror and a spherical mirror are coupled.

7. The clothing management apparatus of claim 1, wherein the processor is configured to:

control the display to display information on the identified degree of contamination of the clothes to be managed, after clothing management based on the recommended management course is completed according to a user instruction, control the optical sensor to re-emit the ultraviolet light into the reception space, and based on a reflected light of the re-emitted light being received through the optical sensor, re-identify the degree of contamination of the clothes to be managed based on an allergen value after the clothing management based on the intensity of the reflected light, and control the display to display information on the re-identified degree of contamination of the clothes to be managed.

8. The clothing management apparatus of claim 7, further comprising:

a communication interface, wherein the processor is configured to:

transmit the information on the identified degree of contamination of the clothes to be managed and the information on the recommended management course to an external apparatus through the communication interface, and after the clothing management based on the recommended management course is completed, transmit the information on the identified degree of contamination of the clothes to be managed to an external device through the communication interface.

9. The clothing management apparatus of claim 1, wherein the recommended management course comprises:

at least one of a fine dust course, a sterilization course, a rapid course, or a powerful course.

10. A control method of a clothing management apparatus, the control method comprising:

emitting an ultraviolet light through an optical sensor;

identifying an allergen value of the clothes to be managed based on an intensity of a reflected light within a wavelength range, due to the emitted light;

identifying a degree of contamination of the clothes to be managed based on the identified allergen value being at a contamination level among a plurality of contamination levels; and displaying information on a recommended management course corresponding to the clothes to be managed based on the identified degree of contamination.

11. The control method of claim 10, wherein the identifying the degree of contamination comprises:

the displaying the information on the recommended management course comprises:

based on the identified contamination level being less than a threshold level, recommending a first management course, and based on the identified contamination level being greater than or equal to the threshold level, recommending a second management course, and wherein a sterilization treatment level of the second management course provides higher sterilization than a sterilization treatment level of the first management course.

12. The control method of claim 10, wherein the control method further comprises:

emitting air into a reception space through an air shower arrangeable on an inner side of a body to accommodate clothes to be managed; and after the clothes to be managed are processed with air shower, emitting the ultraviolet light into the reception space.

13. The control method of claim 12, wherein the optical sensor is arranged on a suction flow path arranged on the inner side of the body and detects an allergen value in air inside the reception space.

14. The control method of claim 12, wherein the optical sensor comprises:

a suction hole that suctions the air inside the reception space;

a filter, arrangeable at some areas of the suction hole, to filter the air;

a discharge hole that discharges air filtered by the filter;

a light emitting part that emits the ultraviolet light to air not filtered by the filter among the air suctioned through the suction hole;

a light transmitting part that receives the reflected light of the emitted light;

a light collecting part that collects the light received from the light transmitting part; and a light receiving part that receives the collected light, and the identifying the allergen value comprises:

identifying the allergen value of the clothes to be managed based on the intensity of the light received through the light receiving part.

15. A non-transitory computer-readable recording medium storing computer instructions to cause an electronic apparatus perform operations in case the instructions are executed by a processor of the electronic apparatus, the operations comprising:

emitting an ultraviolet light through an optical sensor;

identify an allergen value of clothes to be managed based on an intensity of a reflected light within a wavelength range, due to the emitted light;

identifying a degree of contamination of the clothes to be managed based on the identified allergen value being at a contamination level among a plurality of contamination levels; and displaying information on a recommended management course corresponding to the clothes to be managed based on the identified degree of contamination.

16. The non-transitory computer-readable medium of claim 15, the displaying the information on the recommended management course comprises:

based on the identified contamination level being less than a threshold level, recommending a first management course, and based on the identified contamination level being greater than or equal to the threshold level, recommending a second management course, and wherein a sterilization treatment level of the second management course provides higher sterilization than a sterilization treatment level of the first management course.

17. The non-transitory computer-readable medium of claim 15, wherein the operations further comprise:

emitting air into a reception space through an air shower arrangeable on an inner side of a body to accommodate clothes to be managed; and after the clothes to be managed are processed with air shower, emitting the ultra violet light into the reception space.

18. The non-transitory computer-readable medium of claim 17, wherein the optical sensor is arranged on a suction flow path arranged on the inner side of the body and detects an allergen value in air inside the reception space.

19. The non-transitory computer-readable medium of claim 17, wherein the optical sensor comprises:

a suction hole that suctions the air inside the reception space;

a filter, arrangeable at some areas of the suction hole, to filter the air;

a discharge hole that discharges air filtered by the filter;

a light emitting part that emits the ultraviolet light to air not filtered by the filter among the air suctioned through the suction hole;

a light transmitting part that receives the reflected light of the emitted light;

a light collecting part that collects the light received from the light transmitting part; and a light receiving part that receives the collected light, and the identifying the allergen value comprises:

identifying the allergen value of the clothes to be managed based on the intensity of the light received through the light receiving part.

* * * * *